United States Patent [19]
Brow et al.

[11] Patent Number: 6,089,523
[45] Date of Patent: Jul. 18, 2000

[54] INTEGRAL MIRROR BRACKET USING GAS ASSIST

[75] Inventors: Mark J. Brow, Allen Park; David S. Perry, Rochester Hills, both of Mich.

[73] Assignee: Lear Automotive Dearborn, Inc., Southfield, Mich.

[21] Appl. No.: 08/920,858

[22] Filed: Aug. 29, 1997

[51] Int. Cl.[7] .............................. A47F 7/14; B29D 22/00; G02B 7/182
[52] U.S. Cl. ...................... 248/475.1; 264/572; 359/872; 359/877
[58] Field of Search ................... 248/475.1, 476, 248/477, 480, 466, 292.2; 359/841, 848, 849, 871, 872

[56] References Cited

U.S. PATENT DOCUMENTS

| | | | |
|---|---|---|---|
| 3,874,773 | 4/1975 | Kurz, Jr. .................................. | 350/288 |
| 4,807,096 | 2/1989 | Skogler et al. .......................... | 362/142 |
| 5,042,932 | 8/1991 | Pent ........................................ | 359/874 |
| 5,100,187 | 3/1992 | Loren ...................................... | 293/110 |
| 5,447,762 | 9/1995 | Loren ...................................... | 428/34.1 |
| 5,572,354 | 11/1996 | Desmond et al. ....................... | 359/265 |
| 5,583,703 | 12/1996 | Lang et al. .............................. | 359/877 |
| 5,586,675 | 12/1996 | Borsboom et al. ...................... | 220/6 |
| 5,765,737 | 6/1998 | Cucheran et al. ....................... | 224/326 |

FOREIGN PATENT DOCUMENTS

| 6185332 | 7/1994 | Japan . |
|---|---|---|
| 7218887 | 8/1995 | Japan . |

*Primary Examiner*—Anita M. King
*Assistant Examiner*—Michael Nornberg
*Attorney, Agent, or Firm*—MacMillan, Sobanski & Todd, LLC

[57] ABSTRACT

A mirror assembly includes a mirror bracket formed integrally on the interior surface of the mirror shell utilizing gas assist to eliminate sink marks on the outer surface of the shell. The mirror bracket preferably comprises a wall extending from the interior surface of the mirror shell. The wall includes a base portion of increased thickness. A channel is formed by gas assist in the base portion, thereby creating a pair of spaced walls in the base portion of the wall of the mirror bracket.

16 Claims, 3 Drawing Sheets

INTEGRAL MIRROR BRACKET USING GAS ASSIST

BACKGROUND OF THE INVENTION

The present invention relates generally to an exterior vehicle mirror and more particularly to an exterior vehicle mirror having a mirror bracket formed integrally with the mirror shell.

Current exterior vehicle mirrors include a mirror bracket secured to the interior of the mirror shell. A motor mount bracket is secured to a rear surface of the mirror glass and includes a pair of motors pivoting the motor mount bracket and mirror glass relative to the mirror bracket and shell.

The separate mirror bracket requires additional tooling and assembly. Further, the connection between the mirror bracket and shell could become loose or increase vibration-harshness and noise.

It is well known that if an integral protrusion is formed on one side of a plastic wall, such as the rear wall of the mirror shell, sink marks will be formed on the opposite surface of the wall. The sink marks can be eliminated by decreasing the ratio of the thickness of the protrusion to that of the wall. In a mirror assembly, this would require either reducing the thickness of the mirror bracket below a point required for stiffness and strength or increasing the thickness of the rear wall of the mirror shell and thereby increasing the total weight of the mirror assembly.

SUMMARY OF THE INVENTION

The present invention provides a mirror bracket formed integrally with the interior of the mirror shell.

The mirror bracket is formed integrally on the interior surface of the mirror shell utilizing gas assist to eliminate sink marks on the outer surface of the shell. The mirror bracket preferably comprises a wall extending from the interior surface of the mirror shell. The wall includes a base portion of increased thickness.

A channel is formed by gas assist in the base portion, thereby creating a pair of spaced walls in the base portion of the wall of the mirror bracket. Each of the spaced walls is sufficiently thin that is does not create a sink mark on the mirror shell, but the two walls together provide enough strength and stiffness to the mirror bracket to retain the mirror bracket and mirror glass.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
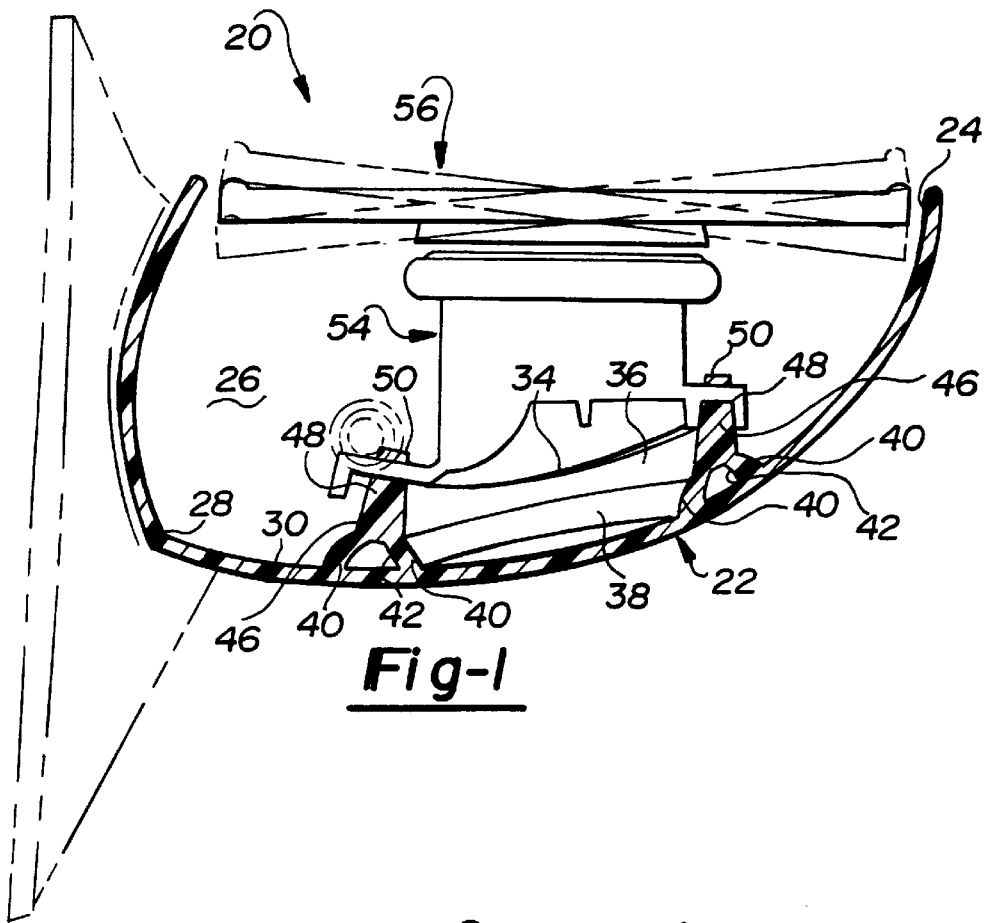
FIG. 1 is a sectional view of a mirror assembly according to the present invention.

A mirror assembly 20 according to the present invention is shown in FIG. 1 including a mirror shell 22 having an orifice 24 leading into a cavity 26. The mirror shell 22 includes an interior surface 28 in the interior of the cavity and a rear wall 30 opposite the orifice 24. The mirror shell 22 includes an integral mirror bracket 34 generally comprising a continuous wall 36 having a base portion 38 of increased thickness. The base portion 38 comprises a pair of spaced walls 40 defining a channel 42 therebetween. The channel 42 is enclosed by the pair of base walls 40 and the rear wall 30 of the mirror shell 22. The integral mirror bracket 34 includes a plurality of bosses 46, continuous with the wall 36. Each boss 46 includes an aperture 48 for receiving a fastener 50.

A motor assembly 54 is secured to the bosses 46 by fasteners 50. The motor assembly 54 is shown schematically; any motor assembly could be used. The motor assembly 54 typically includes a pair of motors (not shown) which tilt and pivot the mirror glass 56 relative to the mirror shell 22 in a known manner.

Figure 2:
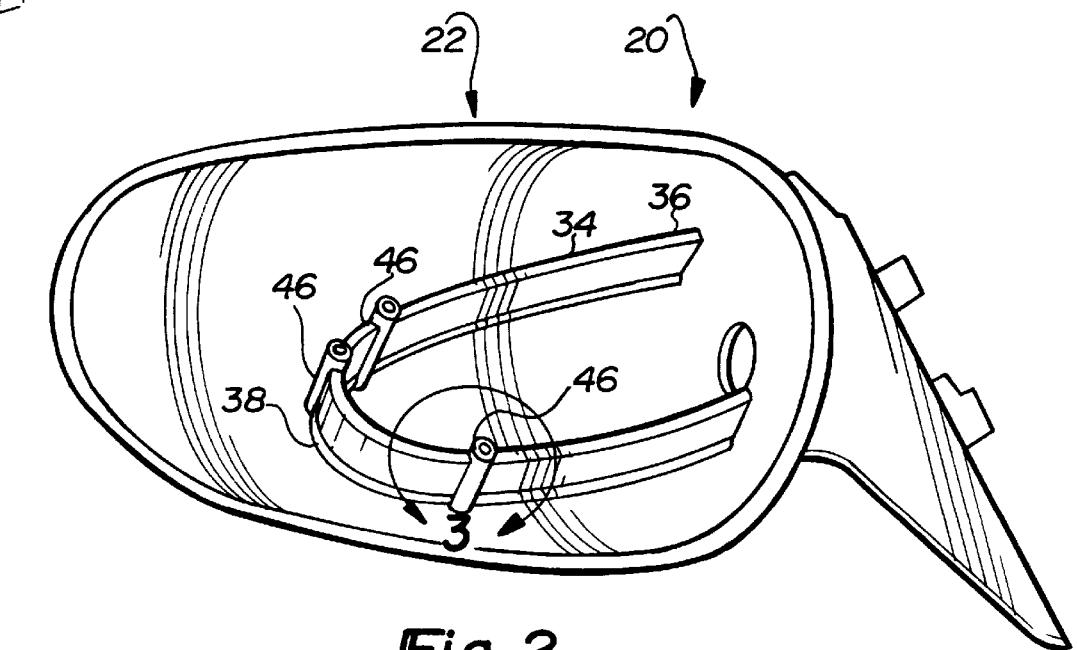
FIG. 2 is a front view of the mirror shell of FIG. 1.

As can be seen in FIG. 2, the mirror bracket 34 generally comprises a continuous wall 36 which is continuous with a plurality of bosses 46. The mirror bracket 34 includes the enlarged base portion 38 beneath both the wall 36 and the bosses 46.

Figure 3:
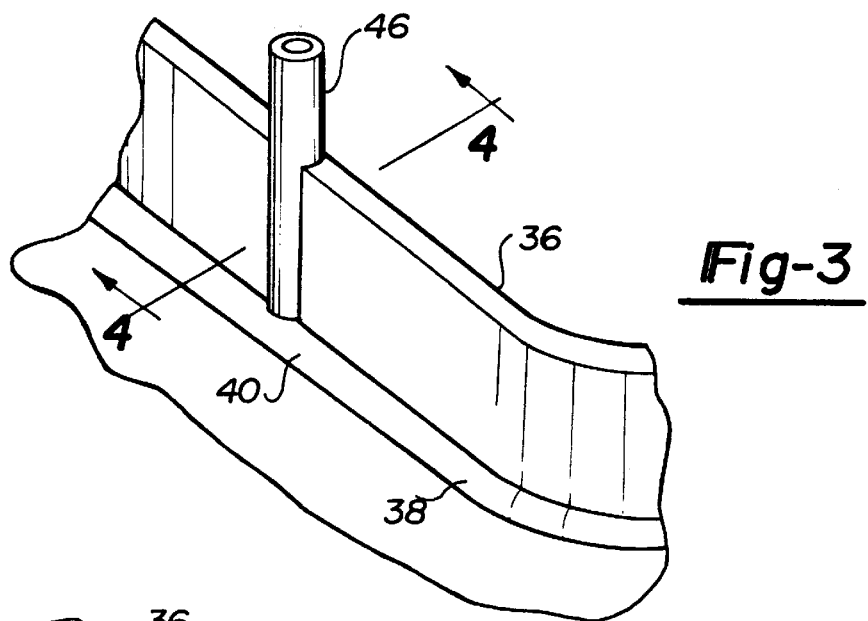
FIG. 3 is an enlarged view of section 3 of FIG. 2.

As can be seen in FIG. 3, each boss 46 is continuous with the wall 36. Further, the enlarged base portion and base walls 40 is continuous beneath both the wall 36 and the bosses 46.

Figure 4:
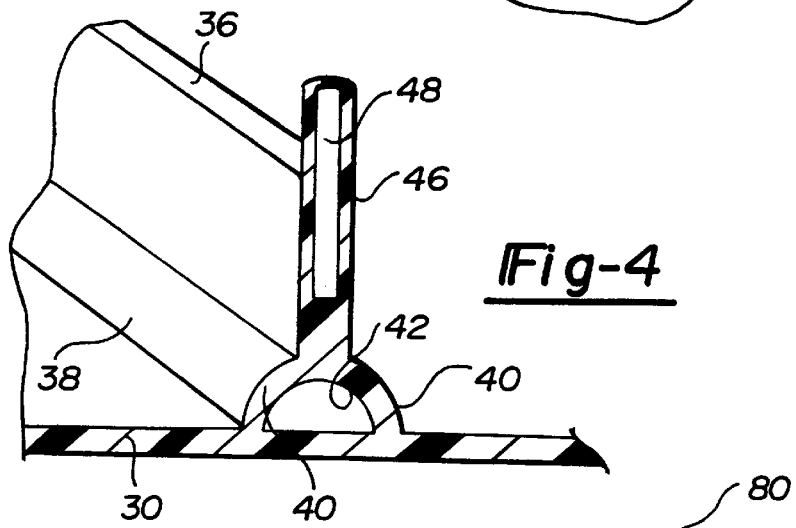
FIG. 4 is a sectional view taken along line 4—4 of FIG. 3.

A sectional view through the boss 46 is shown in FIG. 4. As can be seen in FIG. 4, the channel 42 formed between base walls 40 of the base portion 38 support each of the bosses 46. Preferably, each of the base walls 40 is approximately 50–60% of the thickness of the rear wall 30 of the mirror shell 22. By keeping the thickness of the base walls 40 below 60% of the thickness of the rear wall 30, sink lines on the rear surface of the rear wall 30 can be avoided. Most preferably, the thickness of the base walls 40 is approximately 50% the thickness of the rear wall 30. The spaced base walls 40 provide sufficient strength and stiffness to the boss 46 and wall 36 without causing sink lines on the exterior surface of the rear wall 30.

Channel 42 is preferably formed utilizing gas assist injection molding. The mirror shell 22 is preferably formed of Xenoy 1731 or Xenoy 2230, both available from GE Plastics. Gas assist plastic injection molding is generally a known technique.

Figure 5:
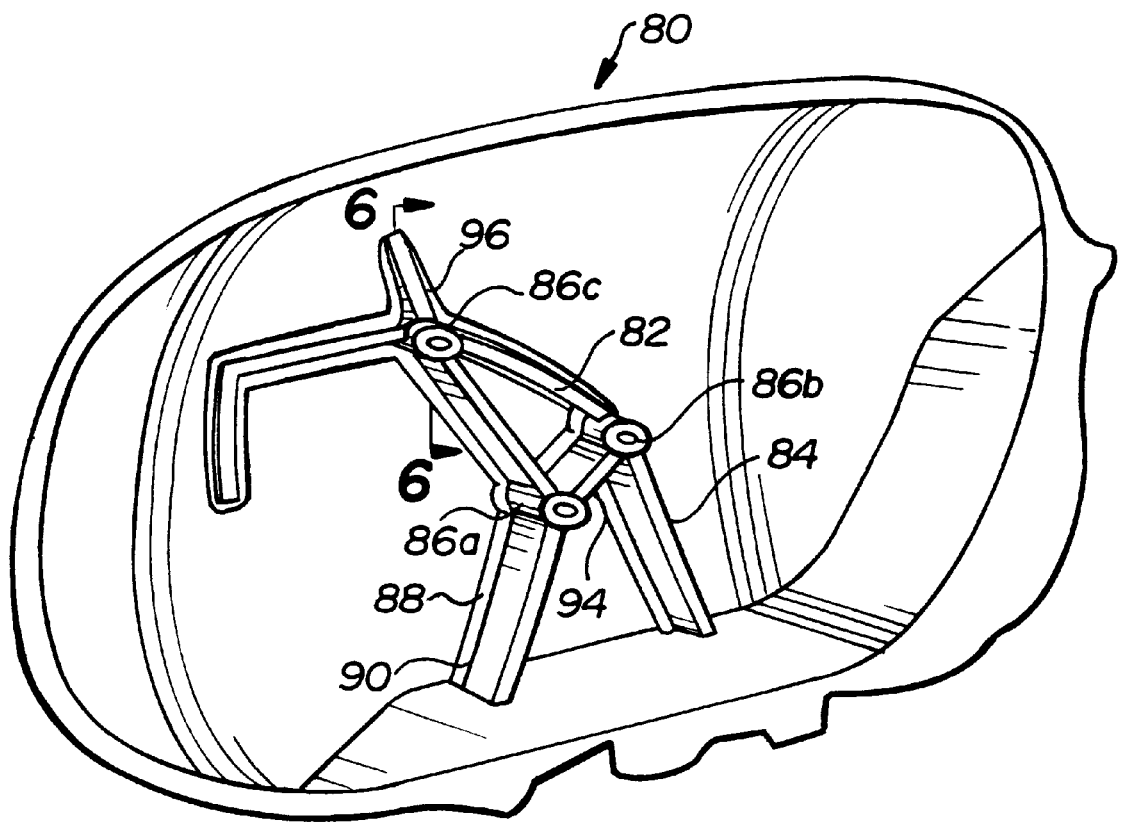
FIG. 5 is a front view of an alternative mirror shell which can be used in the mirror assembly of FIG. 1.

An alternate mirror shell 80 is shown in FIG. 5. The mirror shell 80 includes an integrated mirror bracket 82 comprising a continuous wall 84 continuous with a plurality of bosses 86. The wall 84 and bosses 86 include an enlarged base portion 88 comprising a pair of spaced base walls 90 enclosing a continuous channel beneath the entire wall 84 and all of the bosses 86. The mirror bracket 82 shown in FIG. 5 provides additional support for the bosses 86 in that the wall 84 may extend in three or more directions from each of the bosses 86. For example, a tie wall 94 extends between bosses 86*a*, 86*b*. Further, the boss 86*c* includes a leg 96 extending from the boss 86 solely to provide support to the boss 86. Each of the tie wall 94 and leg 96 includes the base portion 88 and base walls 90 and encloses the channel which is continuous with the remainder of the channel (not shown).

Figure 6:
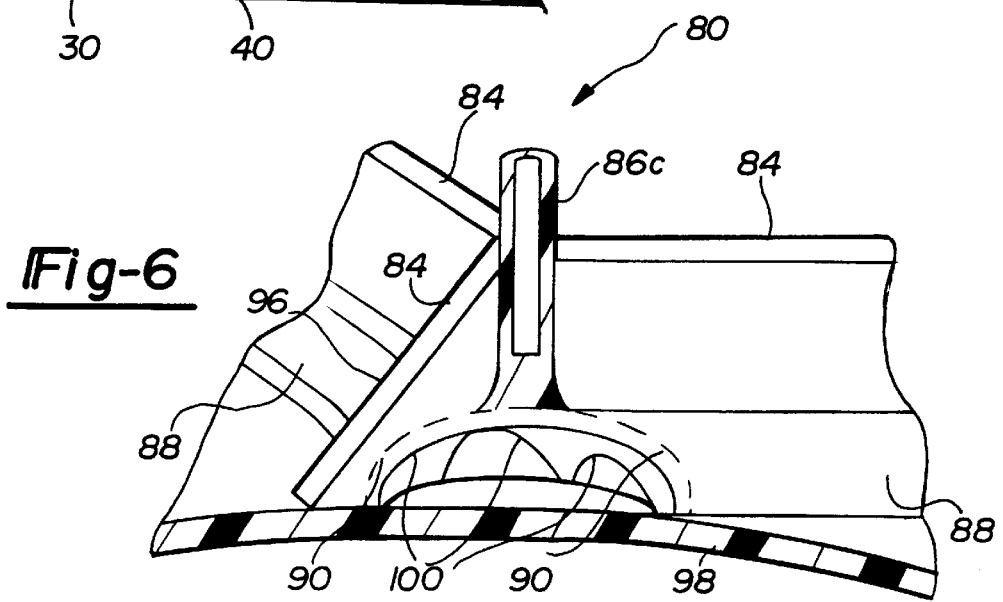
FIG. 6 is a sectional view taken along line 6—6 of FIG. 5.

A sectional view through boss 86*c* is shown in FIG. 6. As can be seen in FIG. 6, the boss 86*c* is provided with support from the wall 84 in four directions, including leg 96. The thickness of the base walls 90 preferably does not exceed 60% of the thickness of the rear wall 98 of the mirror shell 80, and is most preferably 50% of the thickness of the rear wall 98 of the mirror shell 80. The boss 86*c* is thus well supported in each direction, without causing sink lines on the exterior surface of the mirror shell 80. The wall 84 and bosses 86 include an enlarged base portion 88 comprising a pair of spaced base walls 90 enclosing a continuous channel 100 beneath the entire wall 84 and all of the bosses 86.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A mirror assembly comprising:

a mirror shell substantially enclosing a cavity having an interior surface, said mirror shell having an orifice formed therethrough leading to said cavity;

a plurality of bosses extending from said interior;

an intermediate member extending from said interior surface of said mirror shell, said intermediate member comprising a base portion and a continuous wall portion, said base portion formed adjacent said interior surface of said mirror shell and extending between at least two of said bosses, said base portion including a pair of spaced apart base walls defining a channel therebetween, said continuous wall portion also extending between said two bosses, said continuous wall portion having a base which is commonly joined to the upper portions of said pair of spaced apart base portion walls, said intermediate member cooperating with said bosses to define a mirror bracket; and a mirror glass mounted upon said mirror bracket over said orifice.

2. The mirror assembly of claim 1 wherein said channel is continuous beneath said two bosses and said intermediate member between said two bosses.

3. The minor assembly of claim 2 wherein a first boss of said plurality of bosses is continuous with said intermediate member, said intermediate member having at least three intermediate member portions extending from said first boss in different radial directions, said channel continuous beneath said three intermediate member portions and said first boss.

4. The mirror assembly of claim 3 wherein said boss and said three wall portions all include said base portion having said pair of spaced base walls.

5. The mirror assembly of claim 4 wherein said channel is enclosed between said bosses and said interior surface.

6. The mirror assembly of claim 5 further including a motor assembly for pivoting a mirror which includes at least one motor, said motor assembly secured to said mirror glass, said motor assembly and mirror glass mounted upon said mirror bracket.

7. The mirror assembly of claim 1 wherein said base walls are of a thickness less than 60% thickness of said mirror shell adjacent said mirror bracket.

8. The mirror assembly of claim 7 wherein said base walls are of approximately half as thick as said mirror shell adjacent said mirror bracket.

9. A method for manufacturing a vehicle mirror shell having an integrally formed bracket including the steps of:

a) injection molding a mirror shell having an interior surface;

b) molding at least one boss integrally with said mirror shell, said boss extending from said interior surface of said mirror shell and including a base portion of increased thickness;

c) molding a continuous wall integrally with said mirror shell and said boss, said continuous wall extending from said interior surface of said mirror shell and having a base portion of increased thickness;

d) injecting a gas into said base portion of said wall and into said base portion of said boss;

e) creating a channel in said base portion of said wall adjacent to said interior surface of said mirror shell with said gas;

f) forming a pair of spaced apart base walls on either side of said channel, said base walls having a thickness which is less than a thickness of said mirror shell; and g) forming said channel continuously through said base portion of said continuous wall and said base portion of said boss, wherein said base portion of said continuous wall is commonly joined to upper portions of said pair of spaced apart base walls.

10. The method of claim 9 wherein said base walls are less than 60% of the thickness of said mirror shell.

11. The method of claim 10 wherein said base walls are approximately half the thickness of said mirror shell.

12. A mirror assembly comprising:

a mirror shell substantially enclosing a cavity having an interior surface, said mirror shell having an orifice formed therethrough leading to said cavity;

a mirror bracket molded integrally with said mirror shell, said mirror bracket including a wall and a plurality of bosses extending from said interior surface of said mirror shell, said wall and said bosses including a continuous base portion adjacent said interior surface and extending between at least two of said bosses, said base portion comprising a pair of spaced base walls defining a channel therebetween, said base walls having a thickness which is less than a thickness of said mirror shell adjacent said base portion, said channel continuous beneath said wall portion and said bosses, said wall further including a continuous portion extending between at least two of said bosses, said wall continuous portion having a base portion which is commonly joined to the upper portions of said pair of spaced apart base walls;

a motor assembly for pivoting a mirror which includes at least one motor, said motor assembly mounted on said mirror bracket; and a mirror glass mounted to said motor assembly over said orifice.

13. A component having an integral bracket comprising:

a molded polymer component having a surface; and a bracket molded integrally with said component, said component including a wall and a plurality of bosses extending from said surface, said wall and said bosses including a continuous base portion adjacent said surface and extending between at least two of said bosses, said base portion comprising a pair of spaced apart base walls defining a channel therebetween, said base walls generally having a thickness less than a thickness of said component adjacent said base portion, said wall further including a continuous portion extending between at least two of said bosses, said wall continuous portion having a base portion which is commonly joined to the upper portions of said pair of spaced base walls.

14. The component of claim 13 wherein said thickness of said base walls are generally less than 60% the thickness of said component adjacent said base portion.

15. The component of claim 13 wherein said component is a mirror shell.

16. The component of claim 15 further including at least one motor which is adapted to pivot a mirror mounted on said bracket.

* * * * *

UNITED STATES PATENT AND TRADEMARK OFFICE
CERTIFICATE OF CORRECTION

PATENT NO. : 6,089,523
DATED : July 18, 2000
INVENTOR(S) : Mark J. Brow and David S. Perry It is certified that error appears in the above-identified patent and that said Letters Patent is hereby corrected as shown below:

Column 3, claim 1,
Line 5, after the word "interior" insert -- surface of said mirror shell --.

Signed and Sealed this

Eleventh Day of December, 2001

Attest:

NICHOLAS P. GODICI
Attesting Officer    Acting Director of the United States Patent and Trademark Office